US011669573B2

(12) United States Patent
Ishida et al.

(10) Patent No.: US 11,669,573 B2
(45) Date of Patent: Jun. 6, 2023

(54) DATA MANAGEMENT SYSTEM

(71) Applicant: Nomura Research Institute, Ltd., Tokyo (JP)

(72) Inventors: Yuzo Ishida, Tokyo (JP); Nobuo Suga, Tokyo (JP); Satoshi Otake, Tokyo (JP); Daisuke Shimizu, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 467 days.

(21) Appl. No.: 16/678,407

(22) Filed: Nov. 8, 2019

(65) Prior Publication Data

US 2020/0097505 A1 Mar. 26, 2020

Related U.S. Application Data

(63) Continuation of application No. PCT/JP2017/018041, filed on May 12, 2017.

(51) Int. Cl.
*G06F 16/9035* (2019.01)
*G06F 16/901* (2019.01)
(Continued)

(52) U.S. Cl.
CPC .......... *G06F 16/9035* (2019.01); *G06F 3/065* (2013.01); *G06F 3/067* (2013.01);
(Continued)

(58) Field of Classification Search
CPC .... G06F 16/9035; G06F 3/0619; G06F 3/065; G06F 3/067; G06F 16/901; G16Y 30/00; G16Y 40/10; H04Q 9/00
See application file for complete search history.

(56) References Cited

U.S. PATENT DOCUMENTS 10,263,841 B1* 4/2019 Stamatakis ......... H04L 41/0813
2016/0330534 A1* 11/2016 White, Jr. ........... H04L 12/2825
(Continued)

FOREIGN PATENT DOCUMENTS

JP 2005-18175 A 1/2005
JP 2010-55486 A 3/2010
(Continued)

OTHER PUBLICATIONS

International Search Report (ISR) dated Jul. 18, 2017 filed in PCT/JP2017/018041.

*Primary Examiner* — Hosain T Alam
*Assistant Examiner* — Chongsuh Park
(74) *Attorney, Agent, or Firm* — Rankin, Hill & Clark LLP

(57) ABSTRACT

Provided are an AP node to which a plurality of sensors is connected; and a DB node connected to the AP node. The AP node includes: a receiving unit configured to receive measurement data including values of a plurality of measurement items output from each of the sensors; a queue that stores a most recent value in units of measurement items of each of the sensors; a determination unit configured to refer to the queue and then determine whether the value of each of the measurement items has changed, every time the measurement data is output from each of the sensors; a transmission unit configured to, in a case where there is a measurement item having a value change, generate storage data including the value of the measurement item for each of the measurement items and transmit the generated data to the DB node; and an overwriting unit configured to overwrite the most recent value in the queue with a newest value of the measurement item. The DB node includes: a plurality of tables that stores a value included in the measurement data for each of the measurement items of each of the (Continued)

sensors; and a storing unit configured to store the storage data transmitted from the AP node in a corresponding table.

4 Claims, 13 Drawing Sheets

(51) Int. Cl.
    *G06F 3/06*           (2006.01)
    *G06F 40/10*         (2020.01)
    *G16Y 40/10*         (2020.01)
    *G16Y 30/00*         (2020.01)

(52) U.S. Cl.
    CPC .......... *G06F 3/0619* (2013.01); *G06F 16/901* (2019.01); *G16Y 30/00* (2020.01); *G16Y 40/10* (2020.01)

(56) References Cited

U.S. PATENT DOCUMENTS

2017/0124534 A1*   5/2017   Savolainen ............... H04L 9/00
2017/0329918 A1*  11/2017   Kim .................. G06F 16/24578

FOREIGN PATENT DOCUMENTS

| JP | 2015-7824 A | 1/2015 |
|---|---|---|
| JP | 2016-31682 A | 3/2016 |
| WO | 2009/116597 A1 | 9/2009 |

\* cited by examiner

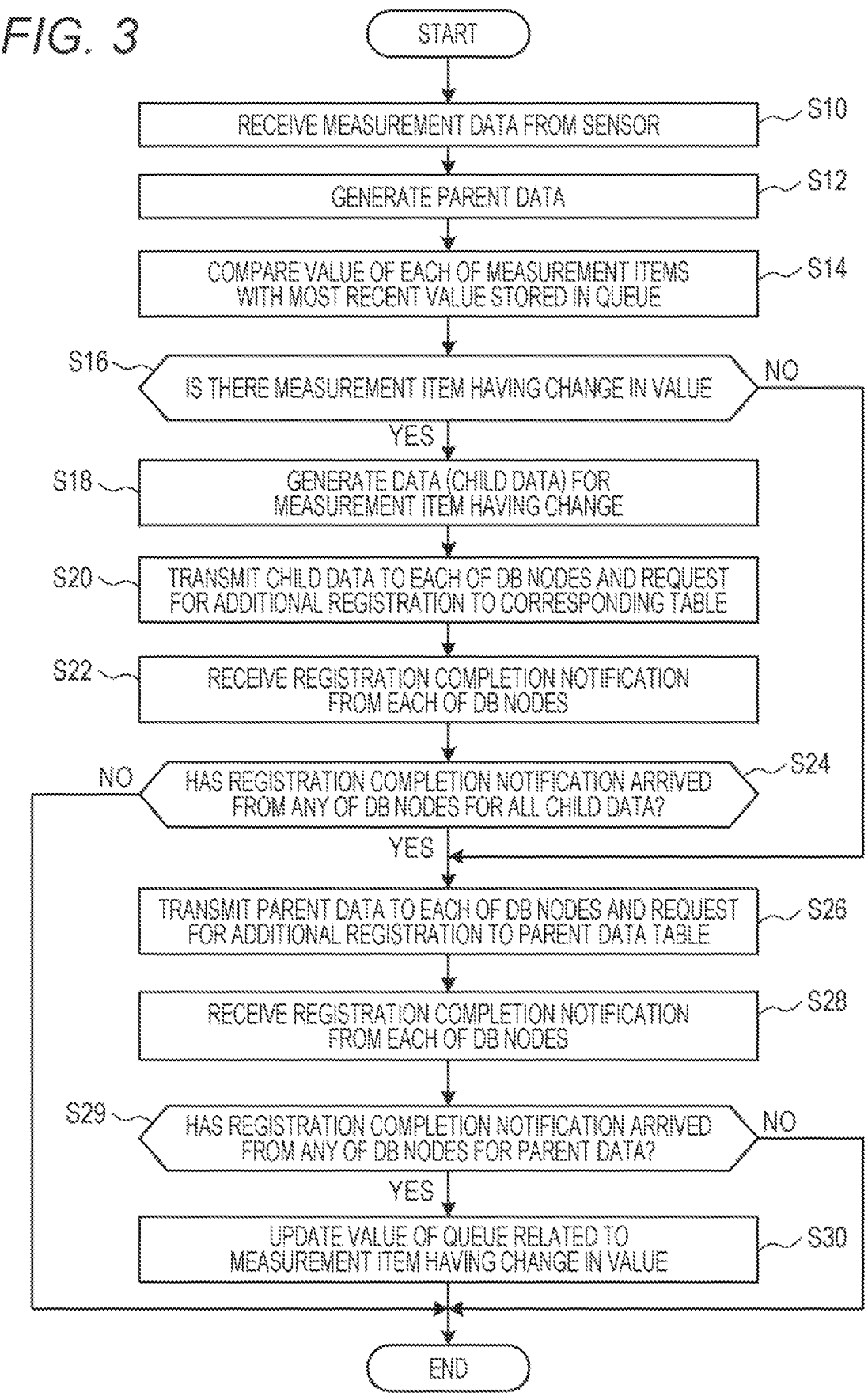

FIG. 4A

| SENSOR ID | TIME STAMP | MEASUREMENT ITEM $\alpha$ | MEASUREMENT ITEM $\beta$ | MEASUREMENT ITEM $\gamma$ | |
|---|---|---|---|---|---|
| A | 170222123918 | 395.0000 | 42.1245 | 38.6632 | ←50 |
| A | 170222123919 | 395.0000 | 42.1245 | 38.6632 | ←51 |
| A | 170222123920 | 395.0000 | 42.1245 | 38.6632 | ←52 |
| A | 170222123921 | 403.9614 | 49.0320 | 38.6632 | ←53 |
| A | 170222123922 | 410.7660 | 38.1044 | 25.9897 | ←54 |

FIG. 4B

| PARENT ID | SENSOR ID | TIME STAMP | |
|---|---|---|---|
| PA12345 | A | 170222123918 | 50p |

| PARENT ID | MEASUREMENT ITEM $\alpha$ | |
|---|---|---|
| PA12345 | 395.0000 | 50a |

| PARENT ID | MEASUREMENT ITEM $\beta$ | |
|---|---|---|
| PA12345 | 42.1245 | 50b |

| PARENT ID | MEASUREMENT ITEM $\gamma$ | |
|---|---|---|
| PA12345 | 38.6632 | 50c |

FIG. 4C

| PARENT ID | SENSOR ID | TIME STAMP | |
|---|---|---|---|
| PA12346 | A | 170222123919 | 51p |

FIG. 4D

| PARENT ID | SENSOR ID | TIME STAMP | |
|---|---|---|---|
| PA12347 | A | 170222123920 | 52p |

FIG. 4E

| PARENT ID | SENSOR ID | TIME STAMP | |
|---|---|---|---|
| PA12348 | A | 170222123921 | 53p |

| PARENT ID | MEASUREMENT ITEM $\alpha$ | |
|---|---|---|
| PA12348 | 403.9614 | 53a |

| PARENT ID | MEASUREMENT ITEM $\beta$ | |
|---|---|---|
| PA12348 | 49.0320 | 53b |

FIG. 4F

| PARENT ID | SENSOR ID | TIME STAMP | |
|---|---|---|---|
| PA12349 | A | 170222123922 | 54p |

| PARENT ID | MEASUREMENT ITEM $\alpha$ | |
|---|---|---|
| PA12349 | 410.7660 | 54a |

| PARENT ID | MEASUREMENT ITEM $\beta$ | |
|---|---|---|
| PA12349 | 38.1044 | 54b |

| PARENT ID | MEASUREMENT ITEM $\gamma$ | |
|---|---|---|
| PA12349 | 25.9897 | 54c |

FIG. 5A

VALUES AT POINT OF RECEPTION OF MEASUREMENT DATA 50

| SENSOR A MEASUREMENT ITEM α (30a) | SENSOR A MEASUREMENT ITEM β (30b) | SENSOR A MEASUREMENT ITEM γ (30c) |
|---|---|---|
| — | — | — |

FIG. 5B

VALUES AT POINT OF RECEPTION OF MEASUREMENT DATA 51 TO 53

| SENSOR A MEASUREMENT ITEM α (30a) | SENSOR A MEASUREMENT ITEM β (30b) | SENSOR A MEASUREMENT ITEM γ (30c) |
|---|---|---|
| 395.0000 | 42.1245 | 38.6632 |

FIG. 5C

VALUES AT POINT OF RECEPTION OF MEASUREMENT DATA 54

| SENSOR A MEASUREMENT ITEM α (30a) | SENSOR A MEASUREMENT ITEM β (30b) | SENSOR A MEASUREMENT ITEM γ (30c) |
|---|---|---|
| 403.9614 | 49.0320 | 38.6632 |

FIG. 5D

| SENSOR A MEASUREMENT ITEM α (30a) | SENSOR A MEASUREMENT ITEM β (30b) | SENSOR A MEASUREMENT ITEM γ (30c) |
|---|---|---|
| 410.7660 | 38.1044 | 25.9897 |

FIG. 11A

| SENSOR ID | TIME STAMP | MEASUREMENT ITEM α | MEASUREMENT ITEM β | MEASUREMENT ITEM γ |
|---|---|---|---|---|
| A | 170222123918 | 395.0000 | 42.1245 | 38.6632 |

| PARENT ID | SENSOR ID | TIME STAMP |
|---|---|---|
| PA12345 | A | 170222123918 |

70p

| PARENT ID | MEASUREMENT ITEM α |
|---|---|
| PA12345 | 395.0000 |

70a

| PARENT ID | MEASUREMENT ITEM β |
|---|---|
| PA12345 | 42.1245 |

70b

| PARENT ID | MEASUREMENT ITEM γ |
|---|---|
| PA12345 | 38.6632 |

| SENSOR ID | TIME STAMP | MEASUREMENT ITEM α |
|---|---|---|
| A | 170222123918 | 395.0000 |

| PARENT ID | SENSOR ID | TIME STAMP |
|---|---|---|
| PA12345 | A | 170222123918 |

70'p

| PARENT ID | MEASUREMENT ITEM α |
|---|---|
| PA12345 | 395.0000 |

| SENSOR ID | TIME STAMP |
|---|---|
| A | 170222123918 |

| PARENT ID | SENSOR ID | TIME STAMP |
|---|---|---|
| PA12345 | A | 170222123918 |

| | SENSOR ID | TIME STAMP | MEASUREMENT ITEM α | MEASUREMENT ITEM β | MEASUREMENT ITEM γ |
|---|---|---|---|---|---|
| 50 | A | 170222123918 | 395.0000 | 42.1245 | 38.6632 |
| 51 | A | 170222123919 | 395.0000 | 42.1245 | 38.6632 |
| 52 | A | 170222123920 | 395.0000 | 42.1245 | 38.6632 |
| 53 | A | 170222123921 | 403.9614 | 49.0320 | 38.6632 |
| 54 | A | 170222123922 | 410.7660 | 38.1044 | 25.9897 |

DATA MANAGEMENT SYSTEM

FIELD OF THE INVENTION

The present invention relates to a data management system, and more particularly to a technology that efficiently stores measurement data transmitted from a plurality of sensors.

DESCRIPTION OF THE RELATED ART

With the advent of the era of Internet of Things (IOT) where all things are connected via the Internet to create new values, a huge amount of measurement data output from various sensors rushes to the servers on the network.
[Non-Patent Literature 1]
What does Internet of Things (IoT) mean?
Internet URL:
https://mono-wireless.com/jp/tech/Internet_of_Things.html
Search date: Apr. 24, 2017

FIG. 12 illustrates a state in which measurement data is periodically uploaded from a plurality of sensors (sensors A20, B21, and C22) installed in various locations to an AP server 80 installed on the Internet, and then the uploaded data is stored in each of sensor tables (sensor A table 86, sensor B table 88, and sensor C table 90) via a DB management unit 84 in a DB server 82.

FIG. 13 illustrates a plurality of pieces of measurement data 50 to 54 transmitted from the sensor A20, and it is observed that values related to three measurement items ($\alpha$ to $\gamma$) are transmitted at intervals of one second.

The AP server 80 that has received the measurement data sequentially causes the sensor A table 86 to store the data via the DB management unit 84.

However, when focusing individual measurement items in each of pieces of measurement data, it is noticed that the values do not necessarily change from the previous measurement, and there are not a few patterns in which the same values continue.

For example, the measurement data 50 to 52 has an entry of a same value for each of the measurement items $\alpha$ to $\gamma$.

Furthermore, when the measurement data 52 and the next measurement data 53 are compared, there is a change in the values for the measurement items $\alpha$ and $\beta$, whereas there is no change in the value for the measurement item $\gamma$.

For convenience of illustration, FIG. 13 illustrates measurement data with a relatively small number of measurement items. Actually, however, measurement data including a huge number of measurement items preliminarily set by the manufacturer of each of sensors is uniformly transmitted to the server side at a timing corresponding to the measurement item having the highest update frequency.

In this manner, the measurement data sequentially transmitted from a sensor includes a lot of data with no value change in units of measurement items. Nevertheless, under present circumstances, the measurement data is transmitted onto the network as it is and stored in a table of the DB server, and this has been a factor of wastefully increasing disk capacity and communication traffic.

SUMMARY OF THE INVENTION

Problems to be Solved by the Invention

The present invention has been made in view of such a situation, and aims to eliminate redundancy of measurement data detected by a sensor and thereby reduce disk capacity and communication traffic.

BRIEF DESCRIPTION OF DRAWINGS

FIG. 3 is a flowchart illustrating a processing procedure of the first data management system;
FIGS. 4A to 4F are diagrams illustrating a structure of measurement data transmitted from a sensor and storage data generated by an AP node;
FIGS. 5A to 5D are diagrams illustrating transition of values stored in a queue of an AP node;
FIGS. 11A to 11F are diagrams illustrating a structure of measurement data transmitted from a sensor and storage data generated by an AP node;
FIG. 13 is a diagram illustrating an example of measurement data transmitted from a sensor.

EXPLANATION OF THE REFERENCES

Figure 1:
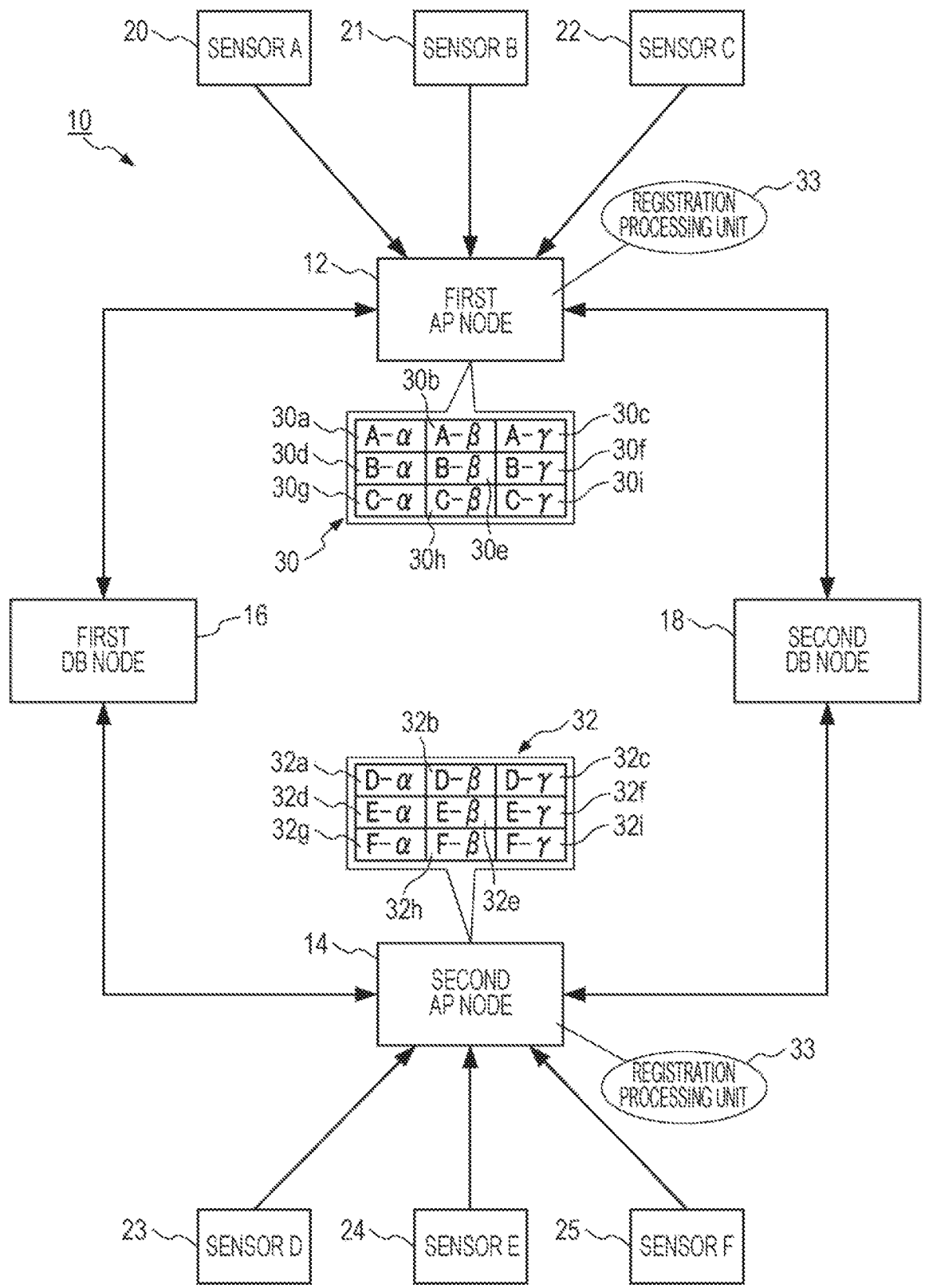
FIG. 1 is an overall configuration diagram of a first data management system according to the present invention.

10 First data management system
12 First AP node
14 Second AP node
16 First DB node
18 Second DB node
20 Sensor A
21 Sensor B
22 Sensor C
23 Sensor D
24 Sensor E
25 Sensor F
30 Queue of first AP node
32 Queue of second AP node
33 Registration processing unit of AP node
34 Data management unit of DB node
40 Parent data table
42a to 42f Measurement item $\alpha$ table
43a to 43f Measurement item $\beta$ table
44a to 44f Measurement item $\gamma$ table
50 to 54 Measurement data
60 Second data management system
62 Registers of sensor
64 Transmission processing unit of sensor
70 Measurement data

Means for Solving the Problem

In order to achieve the above object, a data management system according to claim 1 includes: a receiving unit configured to receive measurement data including values of a plurality of measurement items output from one or more sensors at a predetermined timing; a plurality of tables that stores a value included in the measurement data, for each of the measurement items of each of the sensors; a storage configured to store a most recent value in units of measurement items of each of sensors; a determination unit configured to compare the value included in the measurement data with the most recent value stored in the storage and then determine whether the value of each of the measurement items has changed, every time the measurement data is output from the sensor; a storing unit configured to, in a case where there is a measurement item having a value change, generate storage data including the value of the measurement item for each of the measurement items and store the generated data in a corresponding table; and an overwriting unit configured to overwrite the most recent value in the storage with a newest value of the measurement item.

A data management system according to claim 2 includes: one or more sensors that output values related to a plurality of measurement items at a predetermined timing; and a data management apparatus connected to each of the sensors, in which each of the sensors includes: a storage configured to store a most recent value in units of measurement items; a determination unit configured to compare a current value related to each of the measurement items with the most recent value stored in the storage at a predetermined timing and then determine whether the value of each of the measurement items has changed; an output unit configured to, in a case where there is a measurement item having a value change, output the measurement data including the value of the measurement item to the data management apparatus; and an overwriting unit configured to overwrite the most recent value in the storage with a newest value of the measurement item, and the data management apparatus includes: a plurality of tables that stores a value included in the measurement data for each of the measurement items of each of the sensors; and a storing unit configured to, when the measurement data is output from the sensor, generate, for each of the measurement items, storage data including the value of the measurement item included in the measurement data and store the generated data in a corresponding table.

A data management system according to claim 3 includes: an AP node to which one or more sensors are connected; and a DB node connected to the AP node, in which the AP node includes: a receiving unit configured to receive measurement data including values of a plurality of measurement items output from the sensors at a predetermined timing; a storage configured to store a most recent value in units of measurement items of each of the sensors; a determination unit configured to compare the value included in the measurement data with the most recent value stored in the storage and then determine whether the value of each of the measurement items has changed, every time the measurement data is output from the sensor; a transmission unit configured to, in a case where there is a measurement item having a value change, generate storage data including the value of the measurement item for each of the measurement items and transmit the generated data to the DB node; and an overwriting unit configured to overwrite the most recent value in the storage with a newest value of the measurement item, and the DB node includes: a plurality of tables that stores a value included in the measurement data for each of the measurement items of each of the sensors; and a storing unit configured to store the storage data transmitted from the AP node in a corresponding table.

A data management system according to claim 4 includes: one or more sensors that output values related to a plurality of measurement items at a predetermined timing; an AP node connected to each of the sensors; and a DB node connected to the AP node, in which each of the sensors includes: a storage configured to store a most recent value in units of measurement items; a determination unit configured to compare a current value related to each of the measurement items with the most recent value stored in the storage at a predetermined timing and then determine whether the value of each of the measurement items has changed; an output unit configured to, in a case where there is a measurement item having a value change, output measurement data including the value of the measurement item to the AP node; and an overwriting unit configured to overwrite the most recent value in the storage with a newest value of the measurement item, and the AP node includes: a receiving unit configured to receive measurement data output from each of the sensors; and a transmission unit configured to generate, for each of the measurement items, storage data including a value of each of the measurement items included in the measurement data and transmit the generated data to the DB node, and the DB node includes: a plurality of tables that stores a value included in the measurement data for each of the measurement items of each of the sensors; and a storing unit configured to store the storage data transmitted from the AP node in a corresponding table.

A data management system according to claim 5 is the system according to claim 3 or 4, in which the DB node includes a parent data registration table, and when the AP node generates one or more pieces of storage data related to at least one piece of measurement data, the AP node generates parent data associated with the measurement data, and executes processing of assigning ID of the parent data to the storage data, and after the AP node requests the DB node to register each of pieces of the storage data, and in a case where a registration completion notification regarding the all storage data has arrived from the DB node, the AP node requests the DB node to register the parent data, and in a case where a registration completion notification of any of the storage data has not arrived within a prescribed time, the AP node cancels registration of the parent data, and sets only the storage data in which related parent data has been registered as a target of reference and excludes storage data having no registration of related parent data from the target of reference at the time of reference to registered storage data.

A data management system according to claim 6 is the system according to claim 5, and includes a plurality of DB nodes each having a common table that stores identical data, in which the AP node first requests each of the DB nodes to register storage data, and requests each of the DB nodes to register the parent data at a point when a registration completion notification has arrived from any of the DB nodes for all the storage data, and in a case where a registration completion notification for any of the storage data has not arrived from any of the DB nodes within a prescribed time, the AP node cancels registration of the parent data.

A data management system according to claim 7 is the system according to claims 1 to 6, in which each of the tables has restriction that reference and addition of a record are permitted and deletion and updating are prohibited.

Effects of the Invention

In the case of the data management system according to the present invention, even when the measurement data output from the sensor has a plurality of measurement items, storage data would not be generated for values that have not changed compared to the most recent value, and only the storage data for the measurement item having a value change would be added to be registered in the table, making it possible to greatly save the disk capacity.

This eliminates necessity to compress redundant data at data registration, and as a result, eliminates necessity to perform decompression processing at the time of data reference.

In addition, the table is subdivided in units of measurement items for each of sensors. Therefore, a future demand for increasing the number of measurement items can be handled by simply adding a corresponding table without any need to add correction such as adding items to existing data, making it possible to flexibly expand the system configuration.

In the case of the data management system according to claims 2 and 4, the sensor side includes a function of determining whether there is a change in the value of each of measurement items, and there is a mechanism to hold back an output of the value related to the unchanged measurement item to the outside, making it possible to suppress network traffic.

Furthermore, the data management system according to claim 5 includes a mechanism not to register the parent data for all the storage data until completion of registration in any of the DB nodes.

For this reason, by adopting the rule that "excluding storage data having no registration of corresponding parent data from reference targets at the time of data reference", even in a case where the registration for some of the storage data has failed, there would be no need to perform rollback processing to delete the remaining storage data that has been successfully registered.

Description of the Preferred Embodiments

As illustrated in FIG. 1, a first data management system 10 according to the present invention includes a first AP node 12, a second AP node 14, a first DB node 16, and a second DB node 18.

Note that the numbers of AP nodes and DB nodes are not particularly limited.

The first AP node 12 is connected to the first DB node 16 and the second DB node 18 via a network.

The second AP node 14 is also connected to the first DB node 16 and the second DB node 18 via a network.

Here, "AP node" means a computer on which a program for an AP (Application) server is installed.

The "DB node" represents a server computer on which a database (DB) server program is installed.

However, each of the AP nodes and each of the DB nodes need not be implemented by physically independent computers (having independent AP addresses).

For example, it is allowable to have a configuration as a plurality of AP nodes or DB nodes by performing deployment (designation) specifying a plurality of NUMA nodes (different port numbers) on a same computer (same IP address).

The first AP node 12 is connected to a sensor A20, a sensor B21, and a sensor C22 via a wireless or wired network.

The second AP node 14 is connected to a sensor D23, a sensor E24, and a sensor F25 via a wireless or wired network.

Here, although the use of the same type of sensor having the same measurement items $\alpha$ to $\gamma$ as the sensors A20 to F25 (details will be described below) is assumed, it is also possible to use different types of sensors having mutually different measurement items.

There is no particular limitation on the number of sensors connected to each of the AP nodes.

The first AP node 12 includes a queue 30 as a storage. The queue 30 has a setting of storage regions 30a to 30i for storing the most recent measurement value for each of the measurement items $\alpha$ to $\gamma$ of the sensors A20 to C22.

The second AP node 14 also includes a queue 32 as a storage, and the queue 32 has a setting of storage regions 32a to 32i for storing the most recent measurement value for each of the measurement items $\alpha$ to $\gamma$ of the sensors D23 to F25.

Furthermore, each of the first AP node 12 and the second AP node 14 includes a registration processing unit 33 that requests each of the first DB node 16 and the second DB node 18 to perform operation such as data registration.

The registration processing unit 33 is implemented by operation of the CPU of the server computer under the OS and dedicated middleware.

Figure 2:
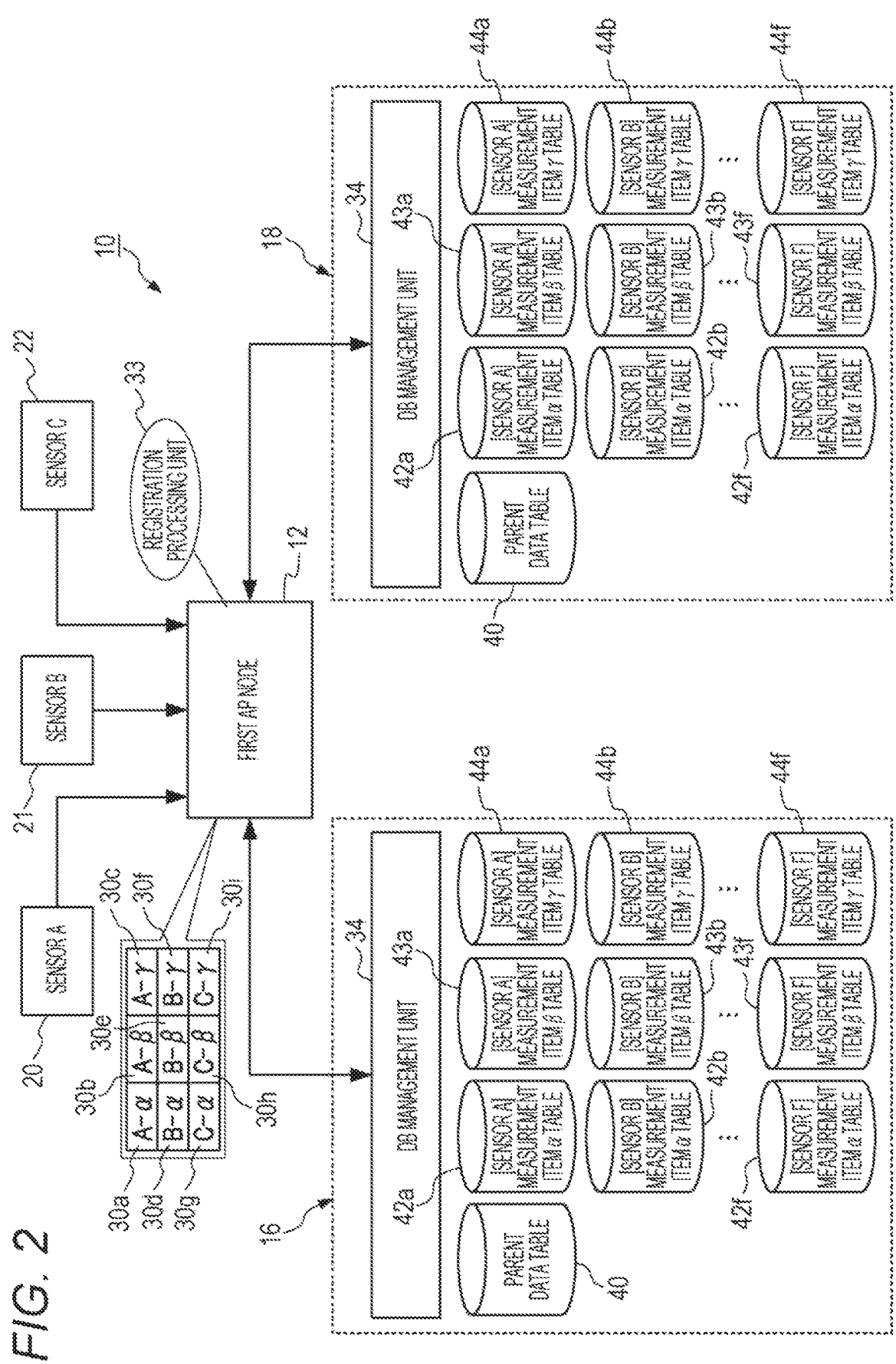
FIG. 2 is a diagram illustrating an example of a table stored in each of DB nodes.

As illustrated in FIG. 2, the first DB node 16 holds a DB management unit 34, a parent data table (TBL) 40, measurement item $\alpha$ tables 42a to 42f, measurement item $\beta$ tables 43a to 43f, and measurement item $\gamma$ tables 44a to 44f. As illustrated in the figure, the measurement item tables are prepared in units of sensors.

Similarly, the second DB node 18 also holds the DB management unit 34, the parent data table 40, the measurement item $\alpha$ tables 42a to 42f, the measurement item $\beta$ tables 43a to 43f, and the measurement item $\gamma$ tables 44a to 44f, related to the sensors A20 to F25.

The table provided in the first DB node 16 and the table of the same name provided in the second DB node 18 have substantially the same configuration.

Here, in the case of registering the measurement data transmitted from the sensors A20, B21, and C22, the registration processing unit 33 of the first AP node 12 simultaneously requests the first DB node 16 and the second DB node 18 for addition of various types of data. Each of the first DB node 16 and the second DB node 18 that has received the requests executes the addition of a record to a necessary table by the DB management unit 34.

Furthermore, in the case of registering the measurement data transmitted from the sensors D23, E24, and F25, the registration processing unit 33 of the second AP node 14 simultaneously requests the first DB node 16 and the second DB node 18 for addition of various types of data. Each of the first DB node 16 and the second DB node 18 that has received the requests executes the addition of a record to a necessary table by the DB management unit 34.

Note that, in the first data management system 10, the value of the measurement data transmitted from each of sensors to the AP node will not be stored in the corresponding table of the DB node as it is, but only a measurement item value having a change from the most recently registered value will be extracted and stored in a dedicated table in units of measurement items (details will be described below).

Moreover, in the first data management system 10, only the addition (INSERT) and reference (SELECT) of data will be allowed for each of tables, and deletion (DELETE) and updating (UPDATE) of data will be prohibited as preliminary restriction.

Hereinafter, a processing procedure of the first data management system 10 will be described with reference to the flowchart of FIG. 3.

First, after the first AP node 12 receives the measurement data 50 illustrated in FIG. 4A from the sensor A20 (S10), parent data (integrated data) 50p including data items of "parent ID", "sensor ID", and "time stamp" is generated by the registration processing unit 33 as illustrated in FIG. 4B (S12).

The data item of "parent ID" of the parent data 50p has an entry of "PA12345" which is a unique identification code generated by the registration processing unit 33.

Next, the registration processing unit 33 refers to the storage regions 30a to 30c related to the sensor A20 in the queue 30, and compares the values of the measurement items α to γ included in the measurement data 50 with most recent values of each of measurement items stored in the queue 30 (S14).

Here, since the measurement data 50 is initial measurement data, no value has been input in the storage regions 30a to 30c of the queue 30, as illustrated in FIG. 5A.

For this reason, the registration processing unit 33 of the first AP node 12 determines that there is a change in the value of each of measurement items (S16/Y), and generates measurement item α data 50a, measurement item β data 50b, and measurement item γ data 50c, as storage data, as illustrated in FIG. 4B (S18).

Each of the measurement item data 50a, 50b, and 50c includes a data item of "parent ID" in addition to the data item that stores the value of each of measurement items. Here, parent ID (PA12345) of the parent data 50p is stored as a primary key. Therefore, each of the measurement item data 50a, 50b, and 50c can be considered as "child data" dependent on the parent data 50p.

Next, the registration processing unit 33 of the first AP node 12 simultaneously transmits all the child data (measurement item α data 50a, measurement item β data 50b, measurement item γ data 50c having the same parent ID) to the first DB node 16 and the second DB node 18 and requests the nodes for additional registration to the corresponding table (S20). In this registration, ordering would not be required between the child data.

In the first DB node 16 and the second DB node 18, the DB management unit 34 stores each of the child data transmitted from the first AP node 12 in the measurement item α table 42a, the measurement item β table 43a, and the measurement item γ table 44a, related to the sensor A, and then, the DB management unit 34 transmits each of registration completion notifications to the first AP node 12.

In contrast, the registration processing unit 33 of the first AP node 12 receives the registration completion notification sequentially transmitted from each of the DB nodes (S22), and at a point when it is confirmed for all the child data that a registration completion notification has arrived from any of the DB nodes in any order within a predetermined time (S24/Y), the registration processing unit 33 transmits the parent data 50p to the first DB node 16 and the second DB node 18, and requests the nodes for registration to the parent data table 40 (S26).

In the first DB node 16 and the second DB node 18, the DB management unit 34 stores the record related to the parent data 50p transmitted from the first AP node 12 in the parent data table 40, and then transmits the registration completion notification to the first AP node 12.

In response to this, the registration processing unit 33 of the first AP node 12 receives the registration completion notification transmitted from each of the DB nodes (S28). At a point when it is confirmed that the registration completion notification has arrived from any of the DB nodes within a predetermined time (S29/Y), the registration processing unit 33 updates the value of the queue 30 for each of the measurement items to a newest value (S30).

That is, as illustrated in FIG. 5B, "395.0000", "42.1245", and "38.6632" are stored in the storage regions 30a to 30c for the measurement items α to γ, respectively.

In a case where there is child data for which a registration completion notification has not arrived from any of the DB nodes within a predetermined time (S24/N), the registration processing unit 33 will not transmit the parent data to any of the DB nodes, and cancels the registration.

In this case, the registration processing unit 33 regenerates each of data and then reattempts registration of the data to each of the DB nodes (details will be described below).

In a case where the registration completion notification has not arrived from any of the DB nodes within a predetermined time for the parent data (S29/N), the registration processing unit 33 finishes the processing without updating the value of the queue 30.

Next, after the first AP node 12 receives measurement data 51 from the sensor A20 (S10), parent data (integrated data) 51p including data items of "parent ID", "sensor ID", and "time stamp" is generated by the registration processing unit 33 as illustrated in FIG. 4C (S12).

Next, with reference to the storage regions 30a to 30c related to the sensor A20 among the queue 30, the registration processing unit 33 compares values of the measurement items α to γ included in the measurement data 51 with most recent values of each of the measurement items stored in the queue 30 (S14).

Here, since there is no difference between the values of each of measurement items in the measurement data 51 and the most recent values stored in the queue (refer to FIG. 5B), the registration processing unit 33 determines that there is no change in the value of each of measurement items (S16/N). All the processing (S18 to S24) related to generation/registration of child data will be skipped, and only the processing (S26 and S28) related to registration of the parent data 51p will be executed.

In this case, since there is no change in the value of each of measurement items, the update processing (S30) of the value of the queue 30 will not be executed as a matter of course.

Next, there is no difference between the measurement data 52 transmitted from the sensor A20, and the measurement data 50, and thus, parent data 52p alone will be generated by the registration processing unit 33 and registered to each of the DB nodes, similarly to the case of the measurement data 51, as illustrated in FIG. 4D.

In contrast, in the case of the measurement data 53 transmitted from the sensor A20 next, there is a difference from the most recent values stored in the storage regions 30a and 30b of the queue 30 with respect to the measurement items α and β. Therefore, as illustrated in FIG. 4E, the measurement item α data 53a and the measurement item β data 53b in addition to parent data 53p will be generated by the registration processing unit 33 (S10 to S18).

Next, the registration processing unit 33 transmits the measurement item α data 53a and the measurement item 1 data 53b to the first DB node 16 and the second DB node 18, and requests the nodes for additional registration to the corresponding table (S20).

At a point when it is confirmed that a registration completion notification has arrived from any of the DB nodes for all the child data within a predetermined time (S22 and S24), the registration processing unit 33 transmits the parent data 53p to the first DB node 16 and the second DB node 18 to request the nodes for additional registration to the corresponding table (S26).

After receiving the registration completion notification of the parent data 53p from any of the DB nodes (S28), the registration processing unit 33 updates the values of the queue 30 related to the measurement items α and β to the newest values (S30).

That is, as illustrated in FIG. 5C, the storage regions 30a and 30b for the measurement items α and β are overwritten with values "403.9614" and "49.0320", respectively (previous values will be held for the storage region 30c for the measurement item γ).

Next, in the case of the measurement data 54 transmitted from the sensor A20, there is a difference from the values stored in the storage regions 30a to 30c of the queue 30 with respect to the measurement items α to γ. Therefore, as illustrated in 4F, parent data 54p, the measurement item α data 54a, the measurement item β data 54b, and the measurement item γ data 54c will be generated by the registration processing unit 33 (S10 to S18).

Next, the registration processing unit 33 transmits the measurement item α data 54a, the measurement item 3 data 54b, and the measurement item γ data 54c to the first DB node 16 and the second DB node 18, and requests the nodes for addition to the corresponding table (S20).

At a point when it is confirmed that a registration completion notification has arrived from any of the DB nodes for all the child data within a predetermined time (S22 and S24), the registration processing unit 33 transmits the parent data 54p to the first DB node 16 and the second DB node 18 to request the nodes for additional registration to the corresponding table (S26).

After receiving the registration completion notification of the parent data 54p from any of the DB nodes (S28), the registration processing unit 33 updates the values of the queue 30 related to the measurement items α to γ to the newest values (S30).

That is, as illustrated in FIG. 5D, the values "410.7660", "38.1044", and "25.9897" are overwritten in the storage regions 30a to 30c for the measurement items α to γ, respectively.

Figure 6:
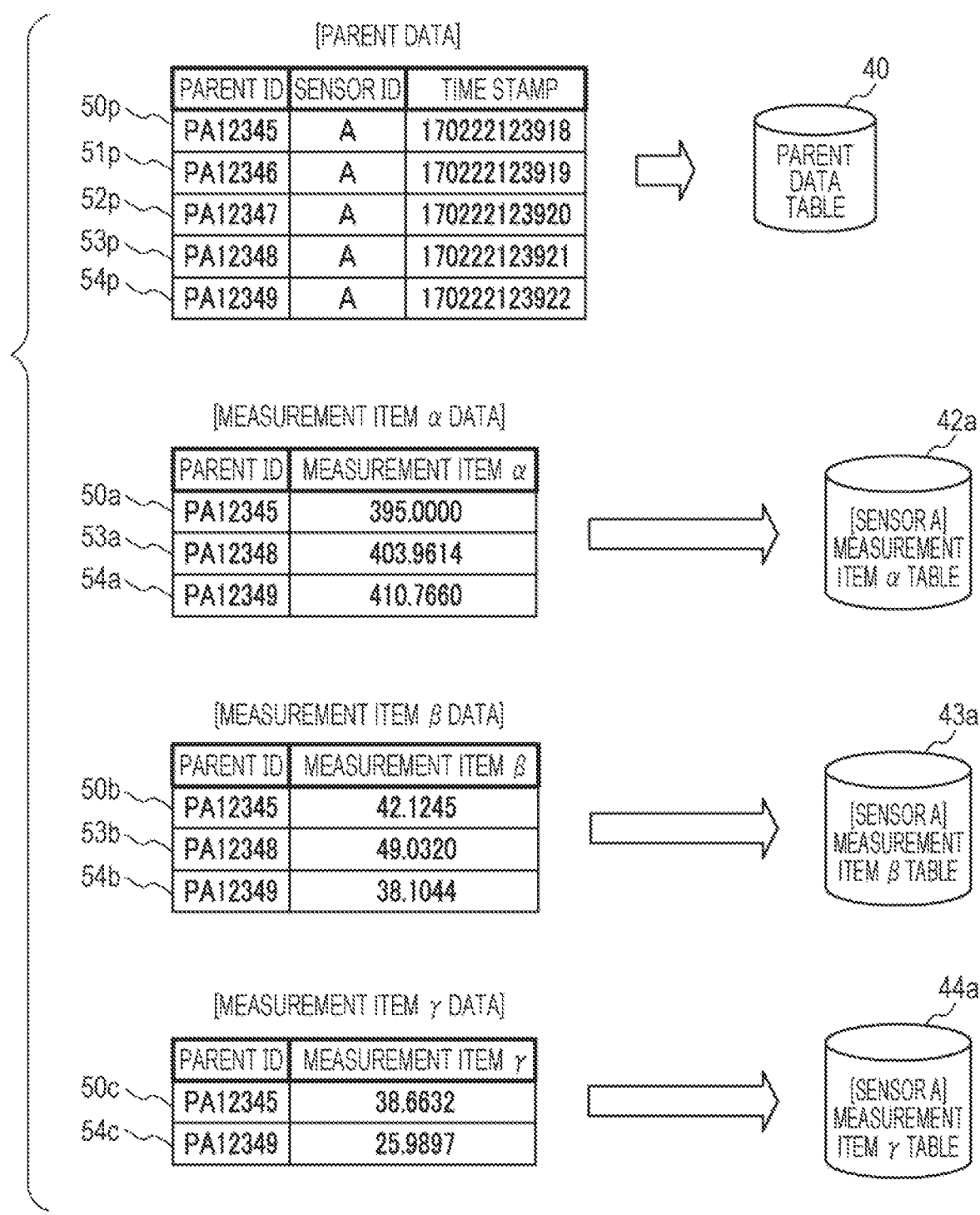
FIG. 6 is a diagram illustrating a state where various pieces of data generated by an AP node are stored in a dedicated table.

As a result of the series of processing described above, as illustrated in FIG. 6, the parent data 50p, 51P, 52P, 53p, and 54p will be stored in each of parent data tables 40 of the first DB node 16 and the second DB node 18.

The measurement item α data 50a, 53a, and 54a are stored in each measurement item α table 42a of the first DB node 16 and the second DB node 18.

In a same manner, measurement item β data 50b, 53b, and 54b are stored in each measurement item β table 43a of the first DB node 16 and the second DB node 18.

In a same manner, the measurement item γ data 50c and 54c are stored in each measurement item γ table 44a of the first DB node 16 and the second DB node 18.

As illustrated in the figure, the record of the measurement item has been added only in a case where there is a change from the most recent value stored in the queue 30. This means that records of the same value are not to be continuously registered. This eliminates the redundancy of the storage data, making it possible to save the disk capacity in the DB node.

Since the parent data table 40 stores time stamps for whole measurement data transmitted from the sensor A20, it is possible to accurately reproduce the state of each of pieces of the measurement data at data reference. For example, from the fact that child data having the parent ID of the parent data 51p is not registered, it is recognizable that the measurement data 51 transmitted from the sensor A at the point "170222123919" has an entry of the same value as before for each of measurement items.

Although the parent data table 40 is not independent in units of sensors, and includes a mixture of the parent data transmitted from each of sensors, the parent data can be classified for each of sensors by individual "sensor ID".

In addition, the table is subdivided in units of sensors for each of the measurement item data. Therefore, a future demand for increasing the number of measurement items can be handled by simply adding a corresponding table without any need to add correction such as adding items to existing data, making it possible to flexibly expand the system configuration.

As described above, the system 10 includes a mechanism not to register the parent data for all the child data until completion of registration in any of the DB nodes.

For this reason, by adopting the rule that "excluding child data having no registration of corresponding parent data from reference targets at the time of data reference", even in a case where the registration for some of the child data has failed, there would be no need to explicitly invalidate remaining child data that has been successfully registered.

Hereinafter, a specific description will be given with reference to FIGS. 7A to 7C.

Figure 7A:
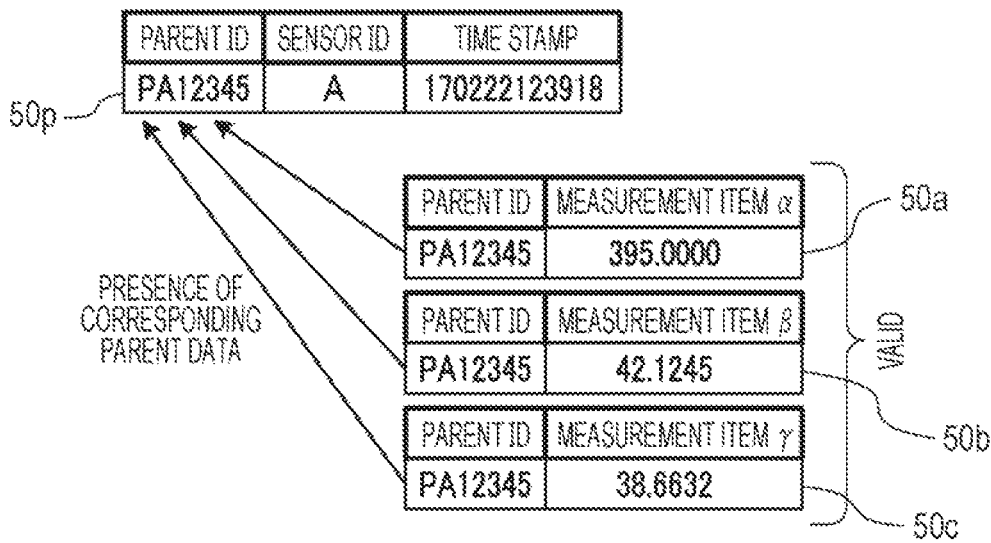
FIGS. 7A to 7C are schematic diagrams illustrating a state where validity/invalidity of child data is determined by the presence or absence of corresponding parent data.

First, FIG. 7A illustrates a successful example, in which all the child data (measurement item α data 50a, measurement item β data 50b, and measurement item γ data 50c) sharing the parent ID "PA12345" is registered, leading to registration of the corresponding parent data 50p, and validating all the data (enabling reference).

Figure 7B:
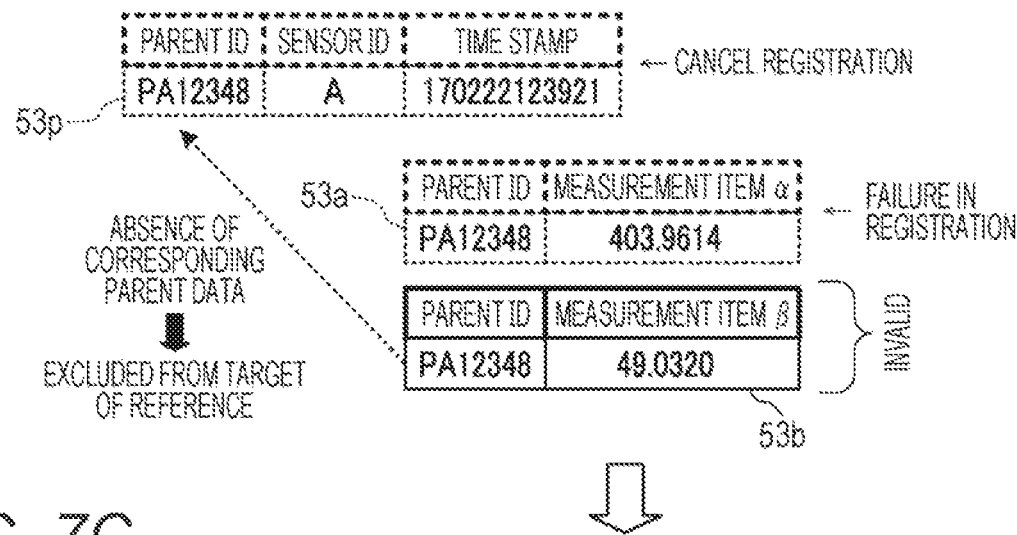

In contrast, FIG. 7B illustrates a failure example, corresponding to a case where time-out is encountered without registration of the measurement item α data 53a among the two pieces of child data (measurement item α data 53a and measurement item β data 53b) sharing the parent ID "PA12348" for a certain reason, resulting in cancellation of registration of the corresponding parent data 53p.

Figure 7C:
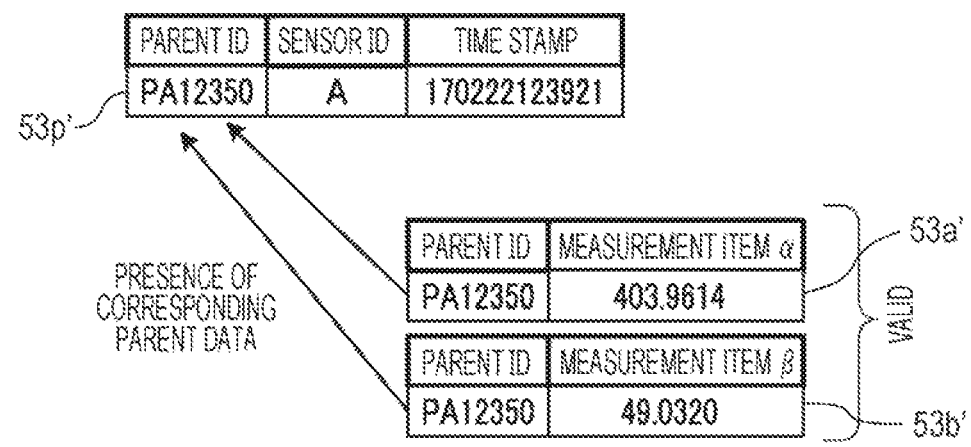

In such a case, as illustrated in FIG. 7C, the registration processing unit 33 of the first AP node 12 regenerates parent data 53p' in which parent ID alone has been changed to "PA12350" and child data (measurement item α data 53a' and measurement item β data 53b'), and attempts registration of each of pieces of child data.

In a case where each of pieces of child data is successfully registered, the corresponding parent data 53p' is also registered, enabling reference of the measurement data 53.

As a result of the above, the measurement item 1 data 53b that has been registered earlier is left on the table of each of DB nodes as it is. However, the rule "excluding child data having no registration of corresponding parent data from the target of reference" is applied, and it is possible to handle child data having no corresponding registered parent data as data out of the target of reference when the AP node performs data aggregation, graph display, or the like. This can prevent an occurrence of inconsistent data reference (dirty read) even without deletion of unnecessary child data.

Generally, when only part of data is registered and the remaining data is not registered for some reason in a case where a group of mutually related pieces of data is to be registered, an illegal state (dirty read) would occur at the time of using the data. To handle this, rollback processing is executed in which a plurality of pieces of data is associated in advance as one transaction, and when registration of some data fails, registration of successful data will be canceled.

Unfortunately, however, in order to implement such rollback processing, there has been a need to impose complicated processing of providing a mechanism for reliably leaving an update log on the DB server side while restoring to the original state using the update log, and this has caused an increase in the load on the DB server.

In addition, the AP server side must wait until a notification of transaction success arrives from the DB server, hindering enhancement of processing efficiency.

In the case of this system 10, a plurality of DB nodes shares a common table and each of pieces of measurement data is registered in duplicate in a plurality of DB nodes. This enables each of the AP nodes to request any of the DB nodes for reference to measurement data, making it possible to perform load distribution at the time of data reference.

In the case of this system 10, a plurality of pieces of measurement data is transmitted to the DB node simultaneously in parallel with any order of registration between each of pieces of the measurement data. Accordingly, it is possible reduce wasteful waiting time compared with a case of sequentially registering pieces of measurement data in a certain order.

Furthermore, the data management unit 34 of each of DB nodes can also issue a registration completion notification to the AP node at a point when the data transmitted from the registration processing unit 33 of the AP node is stored in memory of the DB node.

Conventionally, memory is a volatile storage that loses own data when power supply is stopped. Accordingly, a completion notification has been supposed to be returned at a point when data is stored in a non-volatile storage (hard disk or the like)

However, the system 10 permits data addition alone as operation to the table as described above while it prohibits deletion and updating. Therefore, even when data loss occurs in a certain DB node, it is possible to manage by simply duplicating missing data (difference) from the remaining DB nodes. This eliminates necessity to wait until the data is stored in the hard disk or the like.

The above has described an example in which the AP node side has a function of canceling additional registration of data related to measurement items having no change of values among the data uploaded from each of sensors. Alternatively, however, it is also possible to provide a function to upload data related to measurement items having a change of values on the sensor side so as to achieve substantially similar effects.

Figure 8:
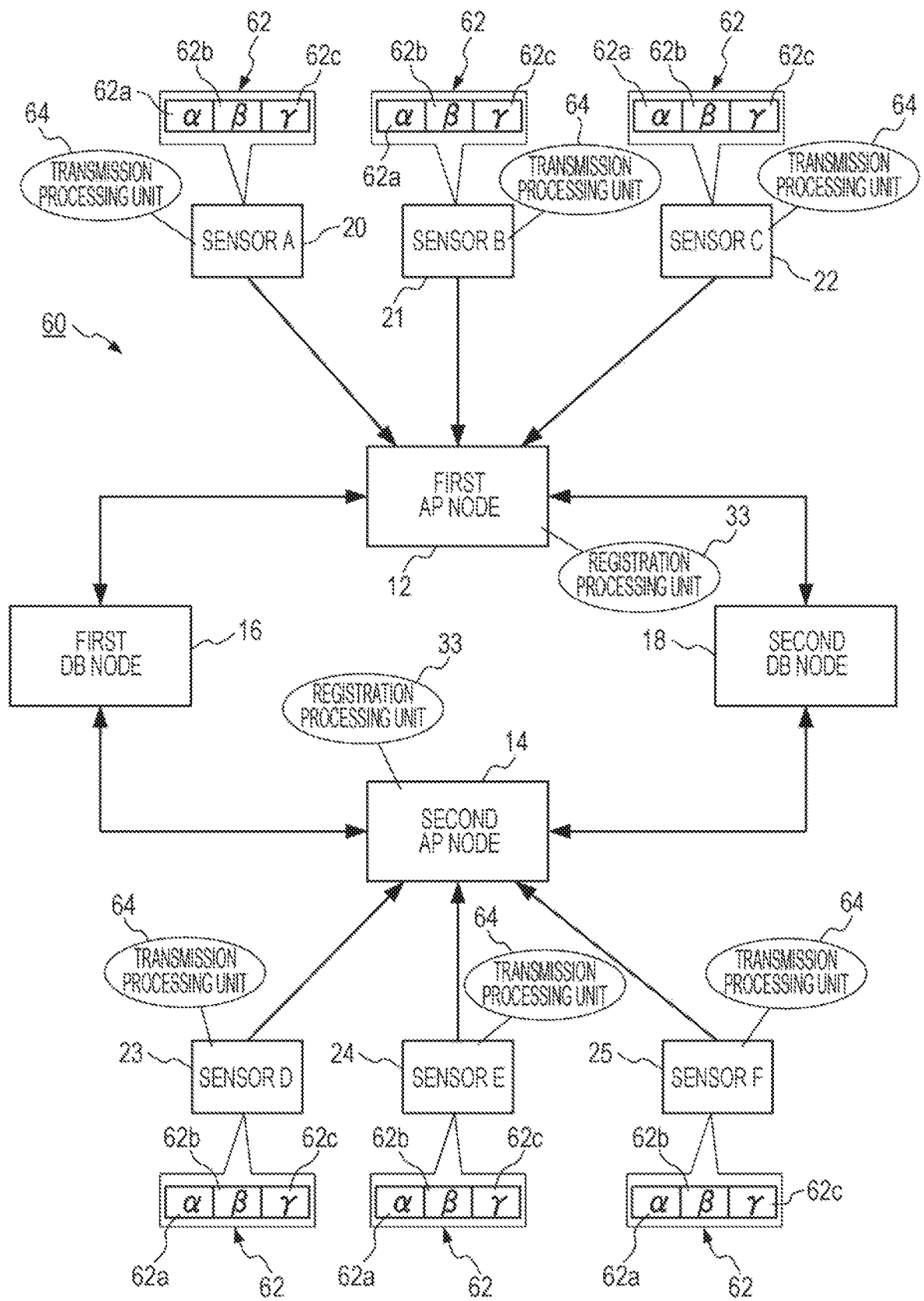
FIG. 8 is an overall configuration diagram of a second data management system according to the present invention.

For example, the second data management system 60 illustrated in FIG. 8 is similar to the first data management system 10 in that it includes the first AP node 12, the second AP node 14, the first DB node 16, the second DB node 18, the sensors A20 to C22 connected to the first AP node 12, and the sensors D23 to F25 connected to the second AP node 14. However, the second data management system 60 is characterized in that it includes a register 62 as a storage in each of the sensors A20 to F25 instead of providing queues 30 and 32 in the first AP node 12 and the second AP node 14.

The register 62 of each of sensors has a setting of storage regions 62a to 62c to store the most recent values for the measurement items α to γ.

Each of the sensors A20 to F25 further includes a transmission processing unit 64.

The transmission processing unit 64 is implemented by a dedicated IC, for example. Alternatively, it is implemented by execution of necessary processing by the CPU of each of sensors according to a dedicated control program.

Although not illustrated, each of the first DB node 16 and the second DB node 18 includes a DB management unit similarly to the above, and further includes a parent data table (TBL), a measurement item α table, a measurement item β table, and a measurement item γ table, for each of the sensors A20 to F25.

Figure 9:
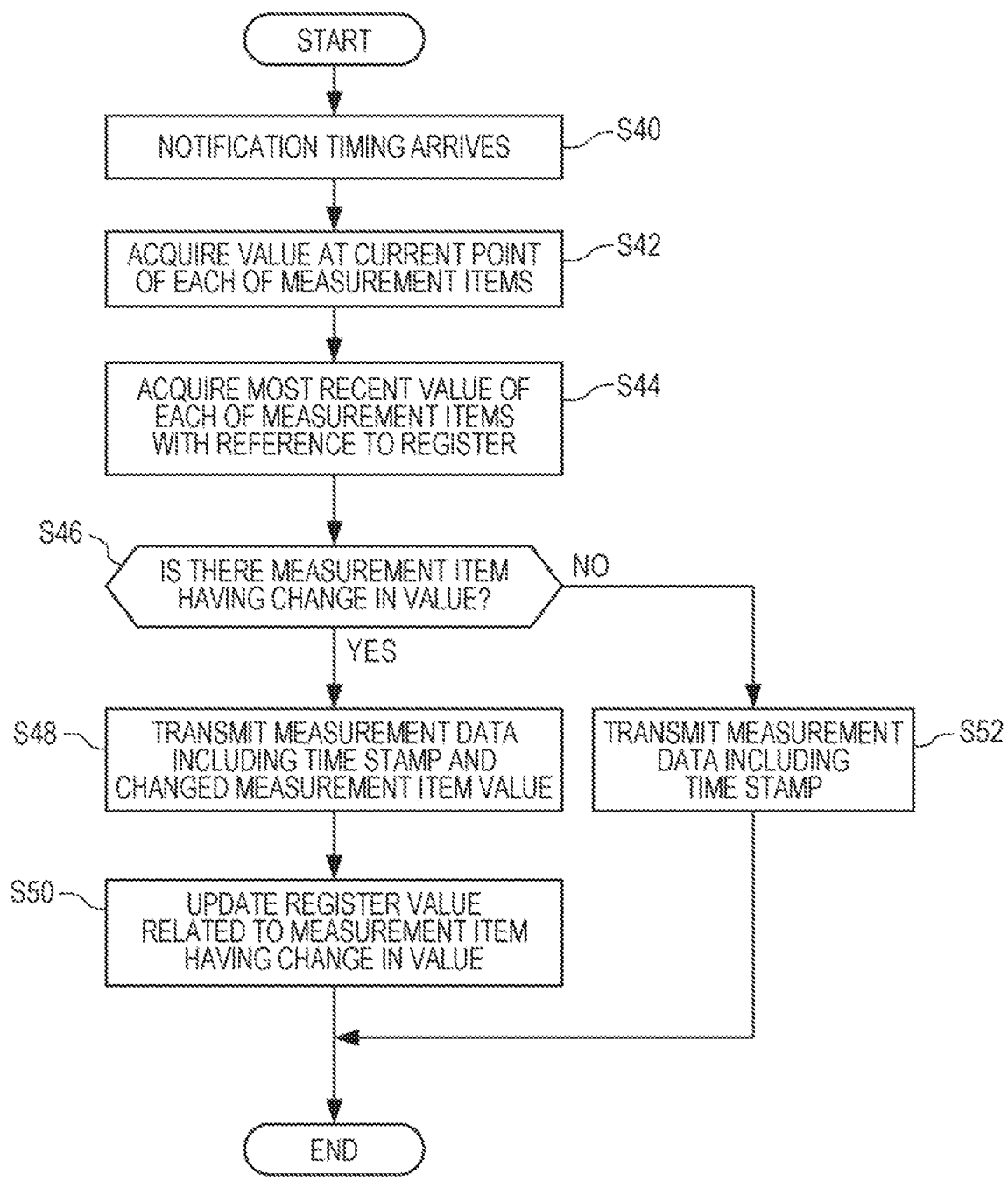
FIG. 9 is a flowchart illustrating a processing procedure on the sensor side in the second data management system.
Figure 10:
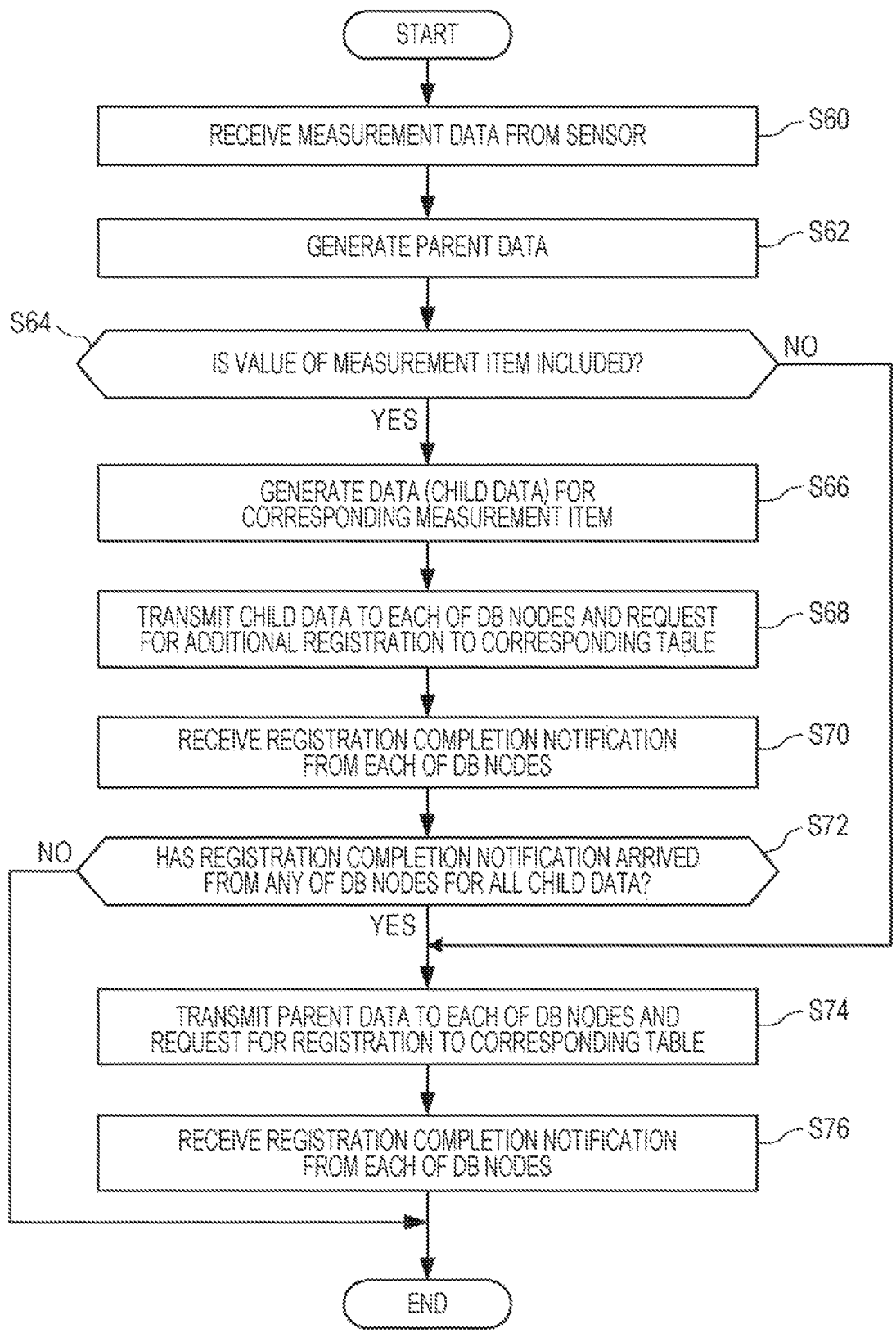
FIG. 10 is a flowchart illustrating a processing procedure on the AP node side in the second data management system.
Figure 12:
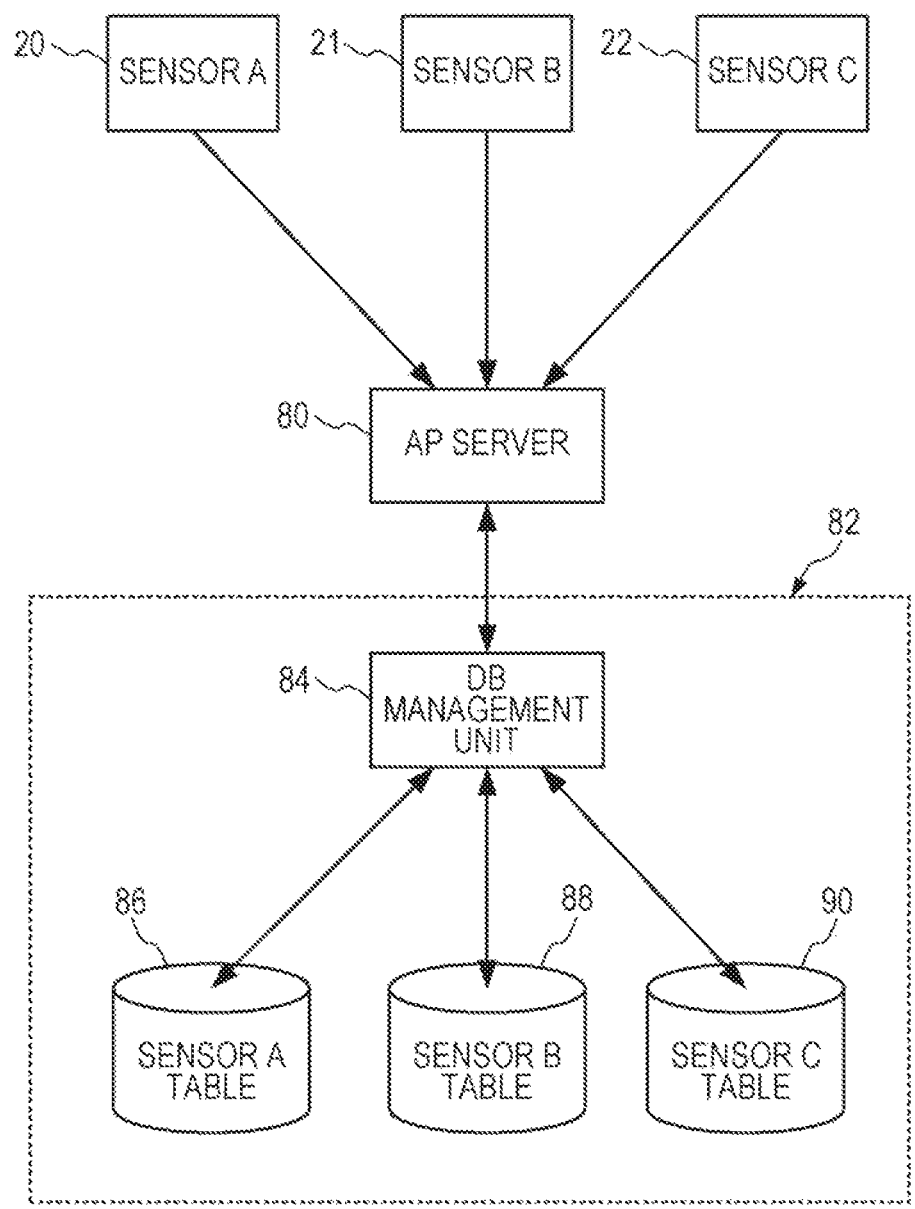
FIG. 12 is an overall configuration diagram illustrating a conventional data management system.

Hereinafter, a processing procedure of the second data management system 60 will be exemplified in accordance with the flowcharts of FIGS. 9 and 10.

First, when a preliminarily set notification timing arrives in any of the sensors (for example, sensor A20) (S40 in FIG. 9), the transmission processing unit 64 acquires a value of each of measurement items at the current point (S42), as well as acquiring the most recent value of each of measurement items stored in the register 62 (S44).

Next, the transmission processing unit 64 compares the two values. In a case where there is a measurement item having a change in the value (S46/Y), the transmission processing unit 64 transmits measurement data including the changed measurement item value to the first AP node 12 (S48).

For example, when all the values of the measurement items α to γ of the sensor A20 have been changed, the transmission processing unit 64 transmits measurement data 70 including a time stamp and three measurement values, as illustrated in FIG. 11A.

In a case where a change is observed in the measurement item α value alone, the transmission processing unit 64 transmits measurement data 70' including the time stamp and the value related to the measurement item α, as illustrated in FIG. 11C.

In contrast, in a case where there is no change in the values of all the measurement items α to γ (S46/N), the transmission processing unit 64 transmits measurement data 70" including the time stamp alone, as illustrated in FIG. 11E (S52).

Thereafter, the transmission processing unit 64 updates the value on the register 62 by overwriting it with the measurement value that has been changed (S50).

Meanwhile, when the first AP node 12 has received the measurement data 70 from the sensor A20 (S60 in FIG. 10), the registration processing unit 33 generates parent data 70p as illustrated in FIG. 11B (S62).

Since the measurement data 70 includes the value of the measurement item (S64/Y), the registration processing unit 33 generates measurement item α data 70a, measurement item β data 70b, and measurement item γ data 70c, as child data (S66).

Similarly to the above, the parent data 70p includes data items of a parent ID, a sensor ID, and a time stamp. In addition, each of measurement items data 70c, 70d, and 70e includes a data item for storing a parent ID and each of measurement values.

Next, the registration processing unit 33 simultaneously transmits all the child data (measurement item α data 70a, measurement item β data 70b, measurement item γ data 70c having an identical parent ID) to the first DB node 16 and the second DB node 18 to request the nodes for addition to the corresponding table (S68). In this registration, ordering would not be required between the child data.

Each of the first DB node 16 and the second DB node 18 stores each of pieces of child data transmitted from the first AP node 12 to the measurement item α table, the measurement item β table, and the measurement item γ table related to the sensor A20, and thereafter, transmits a registration completion notification for each to the first AP node 12.

The registration processing unit 33 of the first AP node 12 receives the registration completion notification sequentially transmitted from each of DB nodes (S70). At a point when it is confirmed that a registration completion notification has arrived from any of the DB nodes in any order for all the child data within a predetermined time (S72/Y), the registration processing unit 33 transmits the parent data 70p to the first DB node 16 and the second DB node 18, and requests the nodes for registration to the corresponding table (S74), and then, receives a registration completion notification from each of the DB nodes (S76).

Conversely, in a case where there is child data for which a registration completion notification has not arrived from any of the DB nodes within a predetermined time (S72/N), the registration processing unit 33 will not transmit the parent data 70p to any of the DB nodes, and cancels the registration.

In this case, the registration processing unit 33 regenerates each of pieces of data with a different parent ID and attempts registration to each of the DB nodes.

In a case where the measurement data transmitted from the sensor A20 includes only the measurement value related to the measurement item α, the data generated by the registration processing unit 33 of the first AP node 12 is parent data 70'p and measurement item α data 70'a alone as a matter of course as illustrated in FIG. 11D, making it possible to save the disk capacity.

Furthermore, in a case where the measurement data transmitted from the sensor A20 includes a time stamp alone and does not include any measurement value of each of measurement items (S64/N), the data generated by the registration processing unit 33 of the first AP node 12 is parent data 70"p alone as illustrated in FIG. 11F, enabling further saving of the disk capacity.

As described above, in the case of the second data management system 60, the sensor side includes a function of determining whether there is a change in the measurement value and transmitting measurement data related to the measurement item that has changed to the AP node only when there is a change. With this configuration, it is possible to greatly reduce network traffic compared to the case where values related to all measurement items are mechanically transmitted at a constant timing regardless of presence or absence of the change.

While the above has described an example in which the AP node receives measurement data output from each of sensors and stores the data in the table in the DB node via the registration processing unit 33 of the AP node and the DB management unit 34 of the DB node, the present invention is not limited to such a configuration.

For example, it is allowable to provide a data management apparatus having both functions of the AP node and the DB node, to cause one or more sensors to be connected to the data management apparatus by wire or wireless communication.

In this case, a function for determining whether there is a change in the value of each of measurement items in each of sensors may be provided on the data management apparatus side, or may be provided on the side of each of sensors.

The above-described first data management system 10 and the second data management system 60 are an example in which the "time stamp" is incorporated into parent data. Alternatively, it is allowable to configure to generate and register the time stamp as one piece of child data having "parent ID", separately from the parent data.

The invention claimed is:

1. A data management system comprising:
an AP (application) node to which one or more sensors are connected; and
a DB (database) node connected to the AP node,
wherein the AP node includes:
a receiving unit configured to receive measurement data including values of a plurality of measurement items output from the sensors at a predetermined timing;
a storage configured to store a most recent value in units of measurement items of each of the sensors;
a determination unit configured to compare the value included in the measurement data with the most recent value stored in the storage and then determine whether the value of each of the measurement items has changed, every time the measurement data is output from the sensor;
a transmission unit configured to, in a case where there is a measurement item having a value change, generate one or more pieces of child data including the value of the measurement item for each of the measurement items and transmit the generated one or more pieces of child data to the DB node; and
an overwriting unit configured to overwrite the most recent value in the storage with a newest value of the measurement item, and
the DB node includes:
a plurality of tables that stores a value included in the measurement data for each of the measurement items of each of the sensors;
a storing unit configured to store each one of the one or more pieces of child data transmitted from the AP node in one of the plurality of tables for the measurement item included in the each one of the one or more pieces of child data; and
a parent data registration table, and
when the AP node generates the one or more pieces of child data related to at least one piece of the measurement data, the AP node generates parent data associated with the measurement data of the one or more pieces of child data, and executes processing of assigning ID of the parent data to the one or more pieces of child data dependent on the parent data such that the one or more pieces of child data and the parent data include a same parent ID, and
after the AP node requests the DB node to register each one of the one or more pieces of child data, and in a case where a registration completion notification regarding the all of the one or more pieces of child data having the same parent ID has arrived from the DB node, the AP node requests the DB node to register the parent data having the same parent ID, and in a case where a registration completion notification of any of the one or more pieces of child data having the same parent ID has not arrived within a prescribed time, the AP node cancels registration of the parent data having the same parent ID, and
the AP node handles, as a target of reference, only the one or more pieces of child data in which the parent data has been registered and excludes the one or more pieces of child data that have been registered in the DB node and stored in the one of the plurality of tables of the DB node but have no registration of the parent data from the target of reference at the time of reference to the registered one or more pieces of child data.

2. A data management system comprising:
one or more sensors that output values related to a plurality of measurement items at a predetermined timing;

an AP (application) node connected to each of the sensors; and
a DB (database) node connected to the AP node,
wherein each of the sensors includes:
a storage configured to store a most recent value in units of measurement items;
a determination unit configured to compare a current value related to each of the measurement items with the most recent value stored in the storage at a predetermined timing and then determine whether the value of each of the measurement items has changed;
an output unit configured to, in a case where there is a measurement item having a value change, output measurement data including the value of the measurement item to the AP node; and
an overwriting unit configured to overwrite the most recent value in the storage with a newest value of the measurement item,
the AP node includes:
a receiving unit configured to receive measurement data output from each of the sensors; and
a transmission unit configured to generate, for each of the measurement items, one or more pieces of child data including a value of each of the measurement items included in the measurement data and transmit the generated one or more pieces of child data to the DB node, and
the DB node includes:
a plurality of tables that stores a value included in the measurement data for each of the measurement items of each of the sensors;
a storing unit configured to store each one of the one or more pieces of child data transmitted from the AP node in one of the plurality of tables for the measurement item included in the each one of the one or more pieces of child data; and
a parent data registration table, and
when the AP node generates the one or more pieces of child data related to at least one piece of the measurement data, the AP node generates parent data associated with the measurement data of the one or more pieces of child data, and executes processing of assigning ID of the parent data to the one or more pieces of child data dependent on the parent data such that the one or more pieces of child data and the parent data include a same parent ID, and
after the AP node requests the DB node to register each one of the one or more pieces of child data, and in a case where a registration completion notification regarding all of the one or more pieces of child data having the same parent ID has arrived from the DB node, the AP node requests the DB node to register the parent data having the same parent ID, and in a case where a registration completion notification of any of the one or more pieces of child data having the same parent ID has not arrived within a prescribed time, the AP node cancels registration of the parent data having the same parent ID, and
the AP node handles, as a target of reference, only the one or more pieces of child data in which the parent data has been registered and excludes the one or more pieces of child data that have been registered in the DB node and stored in the one of the plurality of tables of the DB node but have no registration of the parent data from the target of reference at the time of reference to the registered one or more pieces of child data.

3. The data management system according to claim 1 comprising a plurality of DB nodes each having a common table that stores identical data,
wherein the AP node first requests each of the DB nodes to register the one or more pieces of child data, and
requests each of the DB nodes to register the parent data having the same parent ID at a point when a registration completion notification has arrived from any of the DB nodes for all the one or more pieces of child data having the same parent ID, and
in a case where a registration completion notification for any of the one or more pieces of child data having the same parent ID has not arrived from any of the DB nodes within a prescribed time, the AP node cancels registration of the parent data having the same parent ID.

4. The data management system according to claim 2 comprising a plurality of DB nodes each having a common table that stores identical data,
wherein the AP node first requests each of the DB nodes to register the one or more pieces of child data, and
requests each of the DB nodes to register the parent data having the same parent ID at a point when a registration completion notification has arrived from any of the DB nodes for all the one or more pieces of child data having the same parent ID, and
in a case where a registration completion notification for any of the one or more pieces of child data having the same parent ID has not arrived from any of the DB nodes within a prescribed time, the AP node cancels registration of the parent data having the same parent ID.

* * * * *